United States Patent [19]
Lewis et al.

[11] Patent Number: 6,027,181
[45] Date of Patent: Feb. 22, 2000

[54] LOCOMOTIVE BRAKE CONTROL WITH HOLDING AND/OR BLENDING

[75] Inventors: Roger B. Lewis, Ogdensburg; Jon M. Marra, Henderson, both of N.Y.

[73] Assignee: New York Air Brake Corporation, Watertown, N.Y.

[21] Appl. No.: 09/083,195

[22] Filed: May 22, 1998

[51] Int. Cl.[7] .................................................. B60T 11/26
[52] U.S. Cl. ........................ 303/86; 303/20; 364/426.01
[58] Field of Search ................................. 303/3, 15, 20, 303/28, 86; 364/426.01

[56] References Cited

U.S. PATENT DOCUMENTS

| | | | |
|---|---|---|---|
| 5,104,203 | 4/1992 | Ferri | 303/15 |
| 5,286,096 | 2/1994 | Ferri et al. | 303/15 |
| 5,385,392 | 1/1995 | Ferri | 303/20 |
| 5,590,042 | 12/1996 | Allan, Jr. et al. | 364/426.01 |
| 5,638,276 | 6/1997 | Hart | 364/426.01 |
| 5,721,683 | 2/1998 | Joyce, Jr. et al. | 364/426.01 |
| 5,738,417 | 4/1998 | Wood et al. | 303/7 |
| 5,927,823 | 7/1999 | Dimsa et al. | 303/86 |
| 5,966,674 | 10/1999 | Crawford et al. | 702/47 |
| 5,967,622 | 10/1999 | Dimsa et al. | 303/86 |

*Primary Examiner*—Chris Schwartz
*Attorney, Agent, or Firm*—Barnes & Thornburg

[57] ABSTRACT

A locomotive brake control system including train brake and bail-off with hold and/or blending features. A preliminary brake cylinder pressure control signal is provided to the propulsion system which provides a blending signal as a function of the preliminary brake control signal and dynamic braking. Holding and blending reservoirs are computer simulated.

37 Claims, 4 Drawing Sheets

LOCOMOTIVE BRAKE CONTROL WITH HOLDING AND/OR BLENDING

BACKGROUND AND SUMMARY OF THE INVENTION

The present invention relates generally to locomotive brake controls, and more specifically to a locomotive brake control which has holding and/or blending.

Power brake equipment for locomotives has typically been implemented with mechanical and pneumatic hardware, for example, the 26-L brake equipment from New York Air Brake Corporation of Watertown, N.Y. The prior art brake equipment employs as major components, 26-C brake valve, including an independent brake valve SA-26, 26-F control valve and a J-relay which controls the brake cylinder on the locomotive. An automatic brake handle controls the train brakes through the brake pipe. An independent brake handle independently controls the locomotive brakes. The independent brake handle also includes a bail-off feature for bailing off or release of any automatic brake application on the locomotive brake. A throttle controls the propulsion of the locomotive and train and includes dynamic braking of the locomotive. Such equipment is illustrated in FIGS. 1 and 2 of U.S. Pat. No. 5,590,042.

Electropneumatic control of this equipment has been suggested by the prior art. Computerization of the locomotive brake control taking into consideration the independent brake, the automatic brake and bail-off from the automatic brake is described in U.S. Pat. No. 5,590,042 which is incorporated herein by reference. Such a system does not include a hold feature nor does it take into account any dynamic braking.

A locomotive control system which takes into account manual bail-off from the independent brake handle as well as the dynamic bail-off is described in U.S. Pat. Nos. 5,286,096 and 5,385,392. If a manual or a dynamic bail-off is present and there is no emergency braking, a non-recoverable bail-off is conducted. This requires an additional brake application before the brakes are reapplied. If a manual bail-off or dynamic bail-off is present and there is an emergency condition, recoverable bail-off is conducted. Although the system monitors the dynamic bail-off to determine whether there is a recoverable or non-recoverable bail-off, it does not blend the dynamic bail-off signal with the pneumatic braking signal. Also, it does not disclose the use of a hold feature.

Other pneumatic prior art system includes the number 6-BL brake equipment. This includes an H-6 automatic brake valve and an LA-6-P independent brake valve for controlling the brake equipment. Different from the 26 brake equipment, the H-6 automatic brake handle includes the release running, holding, lap, service and emergency positions. The release and running positions are effectively both release of the train brakes for charging the brake pipe and releasing the train brakes. The hold position is a position which holds the brakes on the locomotive while allowing the train brakes to be released and their auxiliary reservoirs and brake pipe recharged. The service position gives a gradual reduction of brake pipe pressure to cause a service application and the emergency position results in a prompt and heavy application of the brakes. The lap position is used to hold the train brakes applied after a service application. This is purely a mechanical pneumatic system and includes no blending or computerized control.

The brake control system of the present invention is a system for a locomotive which has a propulsion control cable of dynamic braking and a brake cylinder. The system includes an input receiving train brake signals, bail signals, hold signals and blending signals. A computer determines a brake cylinder pressure control signal from the train brake signal, the bail signal, the hold signal and the blending signal. The pressure in the brake cylinder is controlled in response to the brake cylinder control pressure. Typically, the train brake signal and the bail signal are pneumatic signals which may be received from the brake pipe and the 13 or actuating pipe respectfully. The hold signal and blending signal are electric signals. The train brake and bail pneumatic signals are converted to electric signals.

A brake cylinder pressure control signal or a preliminary brake cylinder pressure control signal is determined from the train brake signal and the bail signal. A hold pressure control signal and a blending pressure control signal can also be determined. The pressure in the brake cylinder is then controlled in response to one of the brake cylinder pressure control signal, the hold pressure control signal and a blending pressure control signal. All three of these pressure control signals can be used to control pressure in a respective reservoir. The reservoir may be an actual reservoir or a simulation of the characteristics of a reservoir changed to the pressure value represented by the pressure control signal. The determination of the brake cylinder pressure control signal includes determination of the rate of change of pressure as well as a final pressure value.

Wherein a preliminary brake control pressure signal is determined from the train brake signal and the bail signal, it is provided to the propulsion control system. The propulsion control system then provides a blending signal in response to the preliminary brake control signal and dynamic braking. The brake cylinder is then controlled based on this blended signal. Also, a brake cylinder control signal to reduce the brake cylinder pressure to zero is determined in response to a bail signal. After removal of the bail signal, a brake cylinder control signal is determined to increase the brake cylinder pressure if an emergency brake signal is received before the bail signal or a service brake signal is received after removal of the bail signal. A brake cylinder pressure control signal is determined, which maintains the pressure of the brake signal at its value upon receipt of a hold signal. The hold signal is disregarded if it is present at the same time as a bail signal.

The brake control system for a locomotive may also receive a train brake signal, a bail signal and a hold signal and determine a brake cylinder pressure control signal from the train brake signal, the bail signal and the hold signal. The brake cylinder is controlled in response to the brake cylinder pressure control signal. Similarly, a brake control system for a locomotive having a propulsion control capable of dynamic braking can receive a train brake signal, a bail signal and a blending signal. A preliminary brake control signal is determined from the train brake signal and the bail signal and provided to the propulsion control system. The propulsion control system provides a blending signal responsive to a preliminary brake control pressure signal and dynamic braking. A brake cylinder pressure control signal is determined from the train brake signal, the bail signal and the blending signal and is used to control the pressure in the brake cylinder. Thus, the locomotive brake signal may be controlled using a train brake signal, a bail signal and either a hold signal or a blending signal, or both.

The present invention includes the apparatus for brake controls as well as a method for locomotive brake control.

Other objects, advantages and novel features of the present invention will become apparent from the following

DETAILED DESCRIPTION OF THE PREFERRED EMBODIMENTS

Figure 1:
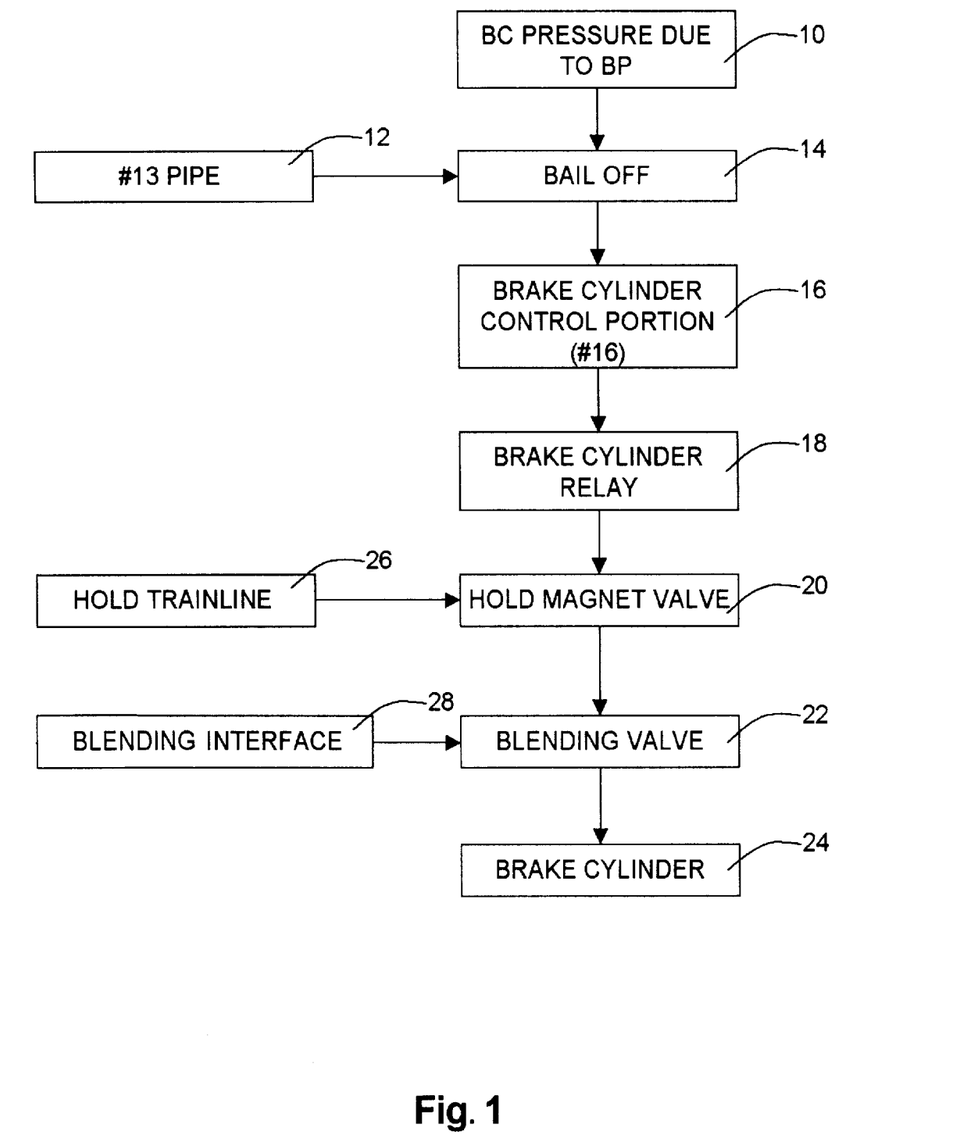
FIG. 1 is a block diagram of a locomotive brake control system incorporating the principles of the present invention.

A locomotive control system which includes hold as well as blending is illustrated in FIG. 1. At 10, a train brake signal is derived from the brake pipe running throughout the train. At 12, a bail signal is derived from the #13 pipe or the actuating pipe running throughout the locomotive consist. Thus, the brake cylinder pressure due to brake pipe and the 13 pipe pressure are provided to the bail-off 14. The output of the bail-off element 14 is provided to the brake cylinder portion number (#16) 16. The brake cylinder control portion 16 then provides a signal to the brake cylinder relay 18. The output of the brake cylinder relay 18 is provided through hold magnetic valve 20 and blending valve 22 to the brake cylinder 24 of the locomotive. A hold trainline 26 controls the hold magnetic relay 20 and a blending interface signal 28 from the propulsion control of the locomotive controls the blending valve 22.

The brake cylinder pressure due to the brake pipe from element 10, the bail-off signal from element 12, the resulting combined bail-off 14, and the brake cylinder control portion 16 may all be pneumatic or electropneumatic portions to provide an electric or pneumatic control to the brake cylinder relay 18. The output of the brake cylinder relay 18 is a pneumatic signal provided to an electropneumatic hold valve 20 whose output is connected through electromagnetic blending valve 22 to the brake cylinder 24. The holding function of element 20 and the blending function of element 22 are performed by a computer.

The bail-off 14 provides a preliminary brake cylinder signal to the brake cylinder control portion 16. The brake cylinder relay 18 provides a signal from the auxiliary reservoir. The magnetic hold valve 20, in response to a hold signal from hold trainline 26, will cut off the brake cylinder relay signal 18 and lap or hold the brake cylinder 24 at the pressure at which it has when the hold signal is received. The blending valve 22 in response to signal from blending interface 28 from the propulsion and control modifies the signal received from the brake cylinder relay 18 through the hold magnetic valve 20 to reduce the brake cylinder pressure 24 for the amount of locomotive braking that can be achieved by dynamic braking in the propulsion system. The hold magnetic valve 20 and the blending valve 22 may be connected to appropriate hold and blending reservoirs under their control to provide an appropriate signal the brake cylinder 24.

The bail-off element 14 and the blending valve 22 may be controlled to have a recoverable or a non-recoverable bail-off. If a 13 pipe bail-off signal is received or a blending reduction of brake is received, the brake cylinder pressure is commanded to go to zero. If an emergency train brake signal is received at 10 before or during bail-off from 12 or reduction from the blending interface 28, the bail-off reduction of brake cylinder pressure is initiated. Upon the release of the bail-off 12 or release of further reduction from blending under 28 is removed, the emergency brake application is reapplied to the brakes 24. This is a Type 1 or recoverable bail-off. If a service brake application was initiated from 10 prior to bail-off from 12 or reduction from the blending interface 28, the brake cylinder is reduced to zero and is not recoverable. This is known as a Type 2 or a non-recoverable bail-off. Reinitiation of braking from a train signal at 10 is required before the locomotive brakes will be applied.

Figure 2:
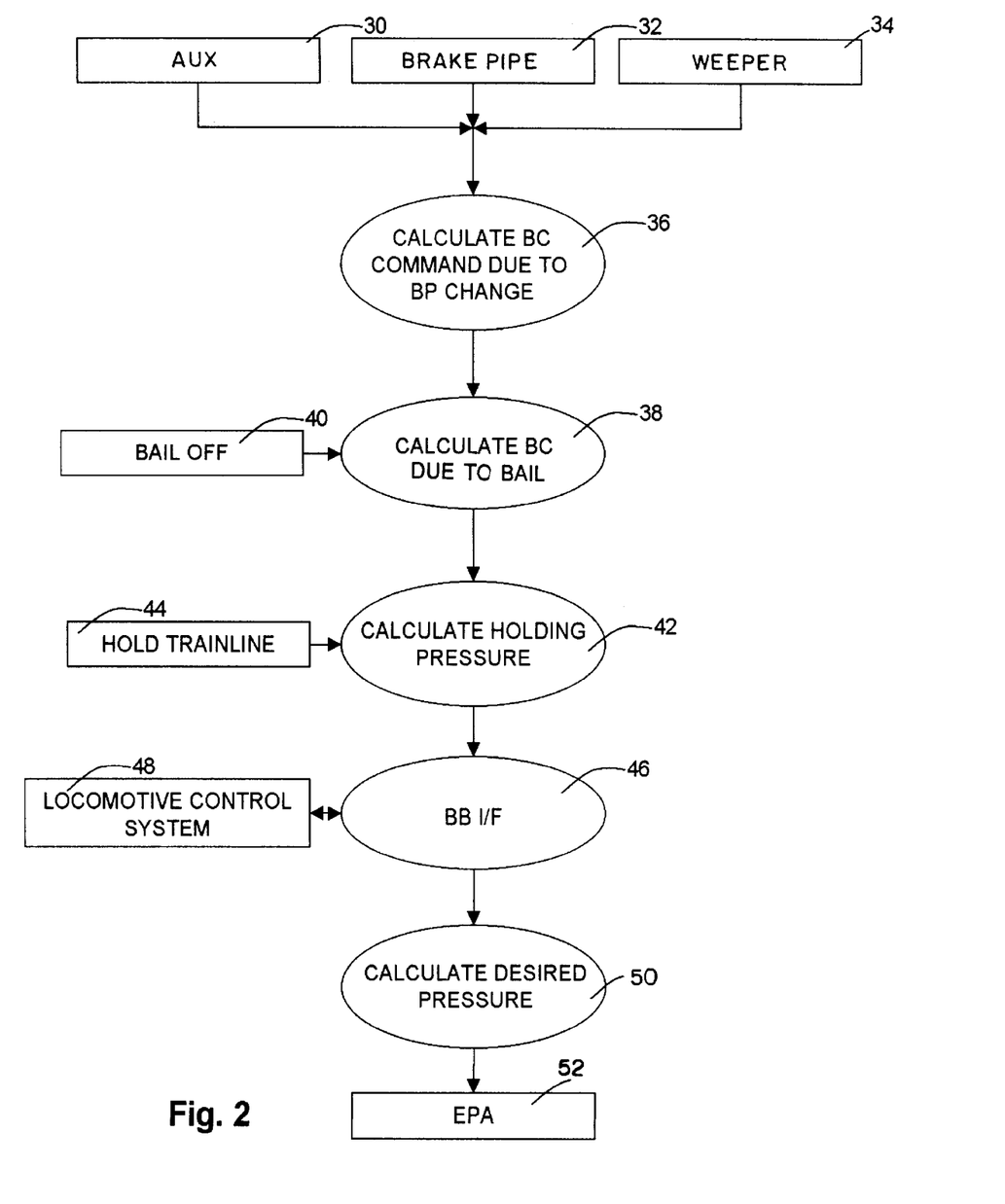
FIG. 2 is a flow chart of a locomotive brake control system incorporating the principles of the present invention.

A microprocessor computer control of the locomotive brake cylinder pressure incorporating hold and blending is illustrated in FIG. 2. The pressure from the auxiliary reservoir 30, the train brake signal from brake pipe 32 and the pressure at weeper port 34 are monitored to calculate a brake cylinder command to the brake pipe change 36. The results are combined with a bail-off signal 40 at 38 to calculate a preliminary brake cylinder pressure. The bail-off 40 would monitor the brake pipe 13 of the actuating pipe or a bail-off signal directly from the control handles. By using pipe 13, each of the locomotives, whether they are in lead or trail, would be able to calculate the bail-off signal for its locomotive brakes. The preliminary brake cylinder control pressure from 38 is used at 42 to calculate a holding pressure based on an input from the hold line 44. The calculated hold pressure from 42 is provided to the locomotive propulsion control at 48 which provides back a blending signal to 46. The blending signal from 46 is provided to 50 wherein the desired pressure and rate is calculated. This provides a jerk rate limited pressure for the brake cylinder control circuit 52.

The brake cylinder control section 52 may be the electropneumatic system illustrated in U.S. Pat. No. 5,590,042 which is incorporated herein by reference, including a relay valve or maybe any other electropneumatic system which is responsive to electronic signals to control the pneumatic pressure in the brake cylinder.

For a service braking, for every 1 PSI drop in brake pipe pressure, a 2.5 PSI increases a brake cylinder command pressure is calculated. A maximum brake cylinder command pressure with service braking would be set, for example, at 42 PSI. When the brake pipe pressure falls below 40 PSI or a vehicle -emergency condition exists, the command pressure is calculated to be of value of 52 PSI. When the brake pipe pressure is increased from its application pressure by more than 2 PSI, the brake cylinder command pressure will be set to zero to release the brakes. These examples of brake pipe pressure are for illustration purposes only and by way of example for comparison and are not to be limiting. The bail-off 40 provides a signal when the actuating pipe or number 13 pipe is charged to 20 PSI or greater. This closes a switch and sends a signal to release the automatic brake. 38 then calculates a brake cylinder pressure due to bail-off or a brake cylinder command pressure to zero.

The calculated desired pressure and rated 50 takes into account the activity to be accomplished.

The brake cylinder increase and decrease rate for a normal service brake application and the brake cylinder decrease rate for an emergency brake release are the same, and for example, 12.5 PSI per second. For an emergency application, the brake cylinder increase rate may be 28.75 PSI per second. For a bail-off, the brake cylinder decrease rate may be 65 PSI per second. For blending requests, the brake cylinder increase rate and brake cylinder decrease rate may be 12.5 PSI per second which is the same as the service application. Again, these are mere examples for comparison of appropriate rate limits.

Figure 3:
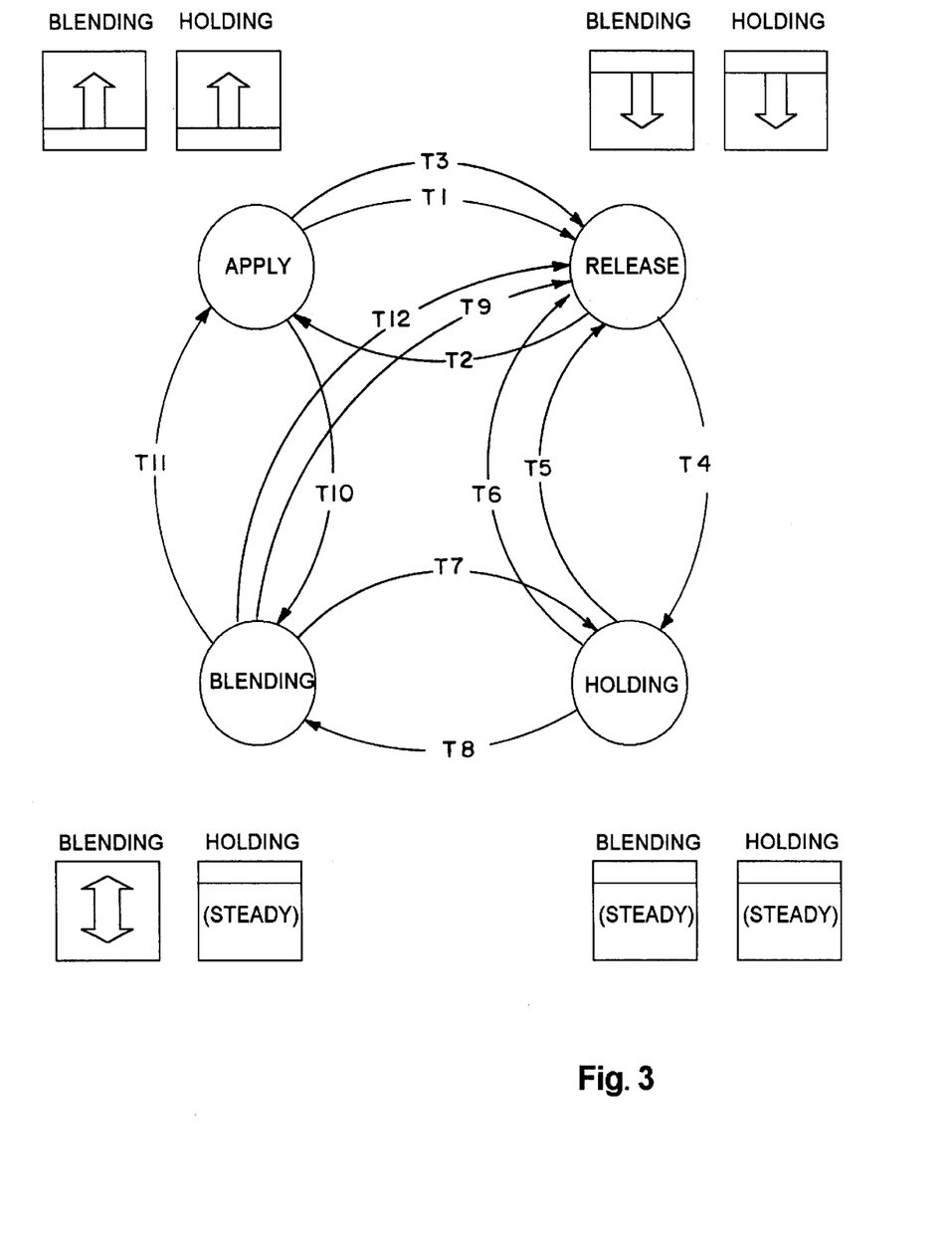
FIG. 3 is a diagram of a state transition chart illustrating the principles of the present invention.

The operation of FIG. 2 will be described with respect to the state diagram of FIG. 3. The boxes illustrate the blending and holding reservoir state. The circles illustrate the apply, release blending and holding states with the appropriate transitions T.

STATES

Apply State

During the Apply state, Brake Cylinder pressure is increased at the prescribed rate to the maximum pressure dictated by either the amount of Brake Pipe pressure drop, or the maximum service brake pressure. In addition, the Holding Reservoir pressure is charged to the same value as Brake Cylinder, so that a transition to the Holding state will not cause a drop in Brake Cylinder pressure. The pressure in the Blending Reservoir is also increased to the same value, so that, if Blending becomes active, Brake Cylinder Pressure may be controlled properly. During this state, the pressure value of the Holding Reservoir is reported to the Blending Control System.

Release State

During the Release state, Brake Cylinder pressure is decreased at the prescribed rate given by one of the following transitions to zero PSI. Also, the Holding Reservoir and Blending Reservoir pressures are reduced at the same rate as Brake Cylinder pressure. In the case of a Bail-off release, pressures in the Holding Reservoir and the Blending Reservoir are reduced to zero. Any subsequent activation of the Brake Hold Trainline will require an additional service reduction of Brake Pipe pressure to increase the pressure in the Holding Reservoir or Blending Reservoir during a Bail-off release. During this state, the pressure value of the Holding Reservoir is reported to the Blending Control System.

Holding State

During the Holding state, the Holding Reservoir, the Blending Reservoir, as well as the Brake Cylinder pressure are held at the current pressure as long as the Brake Hold Trainline is active. During this state, the pressure value of the Holding Reservoir is reported to the Blending Control System.

Blending State

During the Blending State, the Blending Control System is in control of regulated Brake Cylinder Pressure. The pressure value stored in the Holding Reservoir is reported to the Blending Control System. The Blending Control System decides the amount of Friction Braking Effort is needed for the vehicle, and requests that from the Brake Control System. Any change in pressure is adjusted using the current service rate (both application and release) to provide a smooth transition.

Transitions

T1: Direct Brake Release

When Brake Pipe pressure increases at least 2 PSI more than the last point an application was made, AND the Brake Hold Trainline is not active, a command is sent to the Brake Cylinder Reservoir Control Process to begin reducing Brake Cylinder pressure at the prescribed rate. Also, a command is sent to the Brake Cylinder Holding Reservoir Control Process to begin reducing at the prescribed rate. Once the Brake Cylinder pressure has begun to release, it will not re-apply until a further reduction in Brake Pipe pressure occurs (see transition T2) or the Brake Hold Trainline becomes active.

T2: Brake Application

When Brake Pipe pressure reduces at least 2 PSI less than the current auxiliary pressure, a command is sent to the Brake Cylinder Reservoir Control Process to begin increasing Brake Cylinder pressure at the normal service rate. A command is also sent to the Brake Cylinder Holding Reservoir Control Process to begin increasing pressure at the normal service rate.

T3: Bail-Off (Type 2)

When a Bail-off command is caused by the #13 (Actuating Pipe) being charged (as shown above), a command is sent to the Brake Cylinder Reservoir Control Process to begin decreasing Brake Cylinder pressure at the high Bail-off rate. A command is also sent to the Brake Cylinder Holding Reservoir Control Process to begin reducing to zero at the same rate. Once Bail-off becomes active for a Type 2 bail, the state of the Brake Hold Trainline is ignored.

T4: Release and Brake Hold Trainline Active

When the Brake Cylinder control process is in the Release state, and the Brake Hold Trainline becomes active, the pressure in the Blending Reservoir, Brake Cylinder Reservoir and the Holding Reservoir are lapped, or maintained at their current pressure.

T5: Release after Brake Hold Trainline Active

When the Brake Hold Trainline becomes inactive, a command is sent to the Brake Cylinder Holding Reservoir Control Process, the Blending Reservoir Control Process and the Brake Cylinder Control Process to reduce their pressures at the normal service rate.

T6: Type 2 Bail-off from Holding

When a Bail-off command is received, the Brake Cylinder Holding Reservoir Control Process and the Brake Cylinder Control Process are sent commands to begin reducing their respective pressures at the Bail-off rate. Once a Bail-off has begun, Brake Cylinder, the Blending Reservoir, and the Holding Reservoir pressures will reduce to zero and stay there until a subsequent reduction in Brake Pipe pressure has been detected. At this point, the Brake Cylinder pressure sent to the Blending Control Process becomes zero PSI to indicate that the brakes have been bailed-off.

T7: Deactivation of Blending Signal

When the Blending Active signal becomes inactive, a command is sent to the Brake Cylinder Pressure Control Process to return Brake Cylinder pressure to the value store in the Holding Reservoir. Another command is also sent to the Blending Reservoir Control Process to return the pressure in the Blending Reservoir to the same value as that in the Holding Reservoir.

T8: Activation of Blending Signal from Holding

No action is immediately taken when the Blending Active signal becomes active.

T9: Release Command during Blending

When a release command is received due to more than a 2 PSI increase in Brake Pipe pressure, the Holding Reservoir Control Process and Blending Reservoir Control Process are sent commands to begin reducing their internal pressures, as well as that of Brake Cylinder at the normal service release rate.

T10: Blending Signal Active during Apply

At all times during apply, the holding reservoir is held at a constant pressure. When the blending signal is active during the apply state, one of the following responses will take place:

A) If the blending signal is a request for less brake cylinder pressure, the value (virtual pressure) stored in the blending reservoir will be decreased at a service rate; this pressure will be sent to the Brake Cylinder Control Process.

B) If the blending signal is a request for additional brake cylinder pressure, the virtual pressure stored in the blending reservoir will be increased at a service rate to a pressure not exceeding the call pressure, or the brake cylinder pressure due to brake pipe drop; this newly calcuated pressure is sent to the Brake Cylinder Control Process.

C) If no increase or decrease in brake cylinder pressure is requested from the blending link, no action will be taken.

T11: Addition Application made during Blending

When an additional brake application is requested by a decrease in brake pipe pressure, the virtual pressure in the Blending and Holding Reservoirs will be increased proportional to the drop in brake pipe, at a service rate. This additional pressure request is also sent to the EM2000 Blending Interface. Additional brake cylinder pressure will be sent to the Brake Cylinder Control Process.

T12: Type 2 Bail-off during Blending

During a Type 2 Bail-off, pressure in the Blending and Holding Reservoirs will be reduced to zero PSI at a rapid rate. Also, the state of the brake cylinder control process will become release, until another drop is brake pipe pressure is detected and the #13 pipe is no longer charged. The brake cylinder request pressure being sent to the EM2000 blending link will be set to zero PSI.

Figure 4:
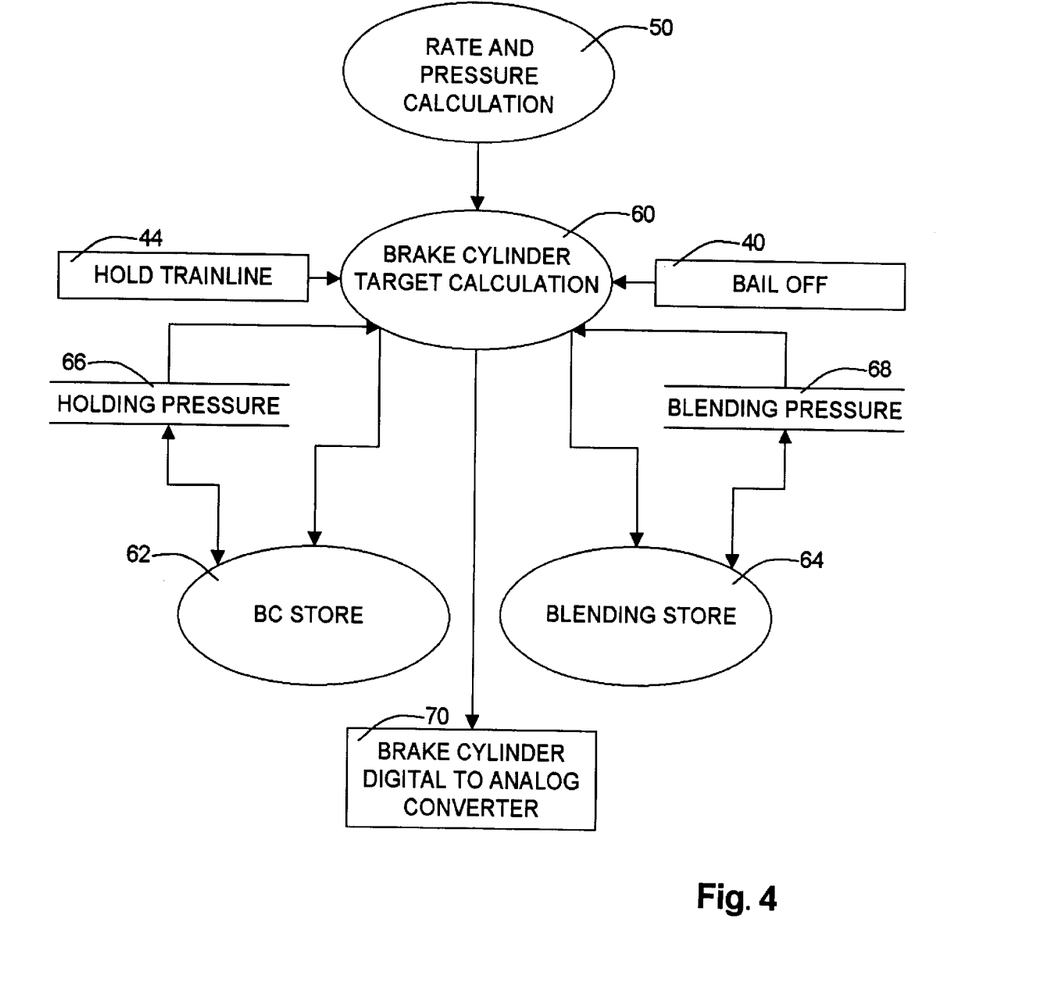
FIG. 4 is a flow chart of the reservoir simulations incorporating the principles of the present invention.

The holding reservoir and the blending reservoir are computer simulations of such reservoirs and the characterization of the charging of pressure in the reservoirs. The calculation is illustrated in the flow chart of FIG. 4. The rate and pressure calculations are provided as an input to the brake cylinder target calculation 60 and combined with the hold trainline input from 44 and the bail-off input from the #13 pipe at 40. The brake cylinder target calculation 60 provides the combined signals from rate and pressure calculated 50, the bail-off 40 and the hold line 44 to the brake cylinder store 62 and the blending store 64. The brake cylinder store 62 and the blending store 64 enter the reservoir simulation for the holding pressure 66 and 68 respectfully, which may be look-up tables or computer calculations of the simulations providing appropriate control signals to the brake cylinder target calculation 60. An appropriate control signal is provided to the brake cylinder digital to analog converter 70, for example, which controls the target pressure and the rate of change of the brake cylinder pressure of that locomotive.

Although the system has been described with respect to providing both a hold and a blending, the system may provide it only with a hold or only with a blending. Both are considered substantial improvements over the prior art.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A brake control system for a locomotive having propulsion control capable of dynamic braking, a brake cylinder, the system comprising:

input means for receiving a train brake signal, a bail signal, a hold signal and a blending signal;

means for determining a brake cylinder pressure control signal from the train brake signal, the bail signal, the hold signal and the blending signal; and means for controlling the pressure in the brake cylinder in response to the brake cylinder pressure control signal.

2. A brake control system according to claim 1, wherein the train brake signal and the bail signal are pneumatic signals and the hold signal and the blending signal are electrical signals.

3. A brake control system according to claim 2, including means for converting the train brake and the bail pneumatic signals to electrical signals.

4. A brake control system according to claim 1, wherein the determining means determines the brake cylinder pressure control signal from the train brake signal and the bail signal and determines a hold pressure control signal and a blending pressure control signal; and the controlling means controls the pressure in the brake cylinder in response to one of the brake cylinder pressure control signal, the hold pressure control signal and the blending pressure control signal.

5. A brake control system according to claim 4, including a brake cylinder control reservoir, a hold pressure control reservoir, a blending pressure reservoir and means for controlling the pressure in a reservoir in response to a respective pressure control signal.

6. A brake control system according to claim 4, wherein the determining means determines the hold pressure control signal and the blending pressure control signal as a simulation of the characteristics of a reservoir changed to a pressure value represented by the pressure control signal.

7. A brake control system according to claim 6, wherein the determining means determines pressure control signals for a rate of change of pressure and final pressure value.

8. A brake control system according to claim 1, wherein the determining means determines brake cylinder pressure control signal for the rate of change of pressure and final brake cylinder pressure value.

9. A brake control system according to claim 1 wherein the determining means determines a preliminary brake control pressure signal from the train brake signal and the bail signal, provides the preliminary brake control pressure signal to the propulsion control and receives from the propulsion control the blending signal in response to the preliminary brake control pressure signal and dynamic braking.

10. A brake control system according to claim 1, wherein the controlling means includes a relay valve connecting a source of pressure to the brake cylinder.

11. A brake control system according to claim 1, wherein the determining means determines a brake cylinder control signal to reduce brake cylinder pressure to zero in response to a bail signal and after removal of the bail signal determines a brake cylinder control signal to increase brake cylinder pressure if an emergency train brake signal was received before the bail signal or a service train brake signal is received after the removal of the bail signal.

12. A brake control system according to claim 1, wherein the determining means determines a brake cylinder pressure control signal which maintains the pressure of the brake cylinder at its value upon receipt of a hold signal.

13. A brake control system according to claim 12, wherein the determining means disregards the hold signal if it is present at the same time as a bail signal.

14. A brake control system for a locomotive having a brake cylinder, the system comprising:

input means for receiving a train brake signal, a bail signal and a hold signal;

means for determining a brake cylinder pressure control signal from the train brake signal, the bail signal and the hold signal; and means for controlling the pressure in the brake cylinder in response to the brake cylinder pressure control signal.

15. A brake control system according to claim 14, wherein the train brake signal and the bail signal are pneumatic signals and the hold signal is an electrical signal.

16. A brake control system according to claim 15, including means for converting the train brake and the bail pneumatic signals to electrical signals.

17. A brake control system according to claim 14, wherein the determining means determines the brake cylinder pressure control signal from the train brake signal and the bail signal and determines a hold pressure control signal and the controlling means controls the pressure in the brake cylinder in response to one of the brake cylinder pressure control signal and the hold pressure control signal.

18. A brake control system according to claim 14, wherein the determining means determines brake cylinder pressure control signal for the rate of change of pressure and final brake cylinder pressure value.

19. A brake control system according to claim 14, wherein the determining means determines a brake cylinder control signal to reduce brake cylinder pressure to zero in response to a bail signal and after removal of the bail signal determines a brake cylinder control signal to increase brake cylinder pressure if an emergency train brake signal was received before the bail signal or a service train brake signal is received after the removal of the bail signal.

20. A brake control system according to claim 14, wherein the determining means determines a brake cylinder pressure control signal which maintains the pressure of the brake cylinder at its value upon receipt of a hold signal.

21. A brake control system according to claim 20, wherein the determining means disregards the hold signal if it is present at the same time as a bail signal.

22. A brake control system for a locomotive having propulsion control capable of dynamic braking, a brake cylinder, the system comprising:
input means for receiving a train brake signal, a bail signal and a blending signal;
means for determining a preliminary brake control pressure signal from the train brake signal and the bail signal, providing the preliminary brake control pressure signal to the propulsion control, receiving from the propulsion control a blending signal in response to the preliminary brake control pressure signal and dynamic braking, and determining a brake cylinder pressure control signal from the train brake signal, the bail signal and the blending signal; and
means for controlling the pressure in the brake cylinder in response to the brake cylinder pressure control signal.

23. A brake control system according to claim 22, wherein the train brake signal and the bail signal are pneumatic signals and the hold signal and the blending signal are electrical signals.

24. A brake control system according to claim 23, including means for converting the train brake and the bail pneumatic signals to electrical signals.

25. A brake control system according to claim 22, wherein the determining means determines brake cylinder pressure control signal for the rate of change of pressure and final brake cylinder pressure value.

26. A method of controlling the brakes of a locomotive which includes a brake cylinder, the method comprising:
receiving a train brake signal, a bail signal and a hold signal;
determining a brake cylinder pressure control signal from the train brake signal, the bail signal and the hold signal; and
controlling the pressure in the brake cylinder in response to the brake cylinder pressure control signal.

27. A method according to claim 26, wherein the train brake signal and the bail signal are pneumatic signals and the hold signal is an electrical signal; and including converting the train brake and the bail pneumatic signals to electrical signals.

28. A method according to claim 26, wherein the determining includes determining the brake cylinder pressure control signal from the train brake signal and the bail signal and determining a hold pressure control signal; and the controlling includes controlling the pressure in the brake cylinder in response to one of the brake cylinder pressure control signal and the hold pressure control signal.

29. A method according to claim 28, wherein the determining includes determining the hold pressure control signal as a simulation of the characteristics of a reservoir changed to a pressure value represented by the pressure control signal.

30. A method according to claim 26, wherein the determining includes determining brake cylinder pressure control signal for the rate of change of pressure and final brake cylinder pressure value.

31. A method according to claim 26, wherein the determining includes determining a brake cylinder control signal to reduce brake cylinder pressure to zero in response to a bail signal and after removal of the bail signal determining a brake cylinder control signal to increase brake cylinder pressure if an emergency train brake signal was received before the bail signal or a service train brake signal is received after the removal of the bail signal.

32. A method according to claim 26, wherein the determining includes determining a brake cylinder pressure control signal which maintains the pressure of the brake cylinder at its value upon receipt of a hold signal.

33. A method according to claim 32, wherein the determining includes disregarding the hold signal if it is present at the same time as a bail signal.

34. A method according to claim 32, wherein receiving includes receiving a blending signal; and determining includes determining a brake cylinder pressure control signal from the train brake signal, the bail signal; the hold signal and the blending signal.

35. A method according to claim 34, wherein the locomotive includes propulsion control capable of dynamic braking; and the determining includes determining a preliminary brake control pressure signal from the train brake signal and the bail signal, providing the preliminary brake control pressure signal to the propulsion control and receiving from the propulsion control the blending signal in response to the preliminary brake control pressure signal and dynamic braking.

36. A method of controlling the brakes of a locomotive which includes a brake cylinder and a propulsion control capable of dynamic braking, the method comprising:
receiving a train brake signal, a bail signal and a blending signal;
determining a preliminary brake control pressure signal from the train brake signal and the bail signal;
providing the preliminary brake control pressure signal to the propulsion control and receiving from the propulsion control the blending signal in response to the preliminary brake control pressure signal and dynamic braking;

determining a brake cylinder pressure control signal from the train brake signal, the bail signal and the blending signal; and controlling the pressure in the brake cylinder in response to the brake cylinder pressure control signal.

37. A method according to claim 36, wherein the train brake signal and the bail signal are pneumatic signals and the blending signal is an electrical signal; and including converting the train brake and the bail pneumatic signals to electrical signals.

* * * * *